United States Patent Office 3,423,037
Patented Jan. 21, 1969

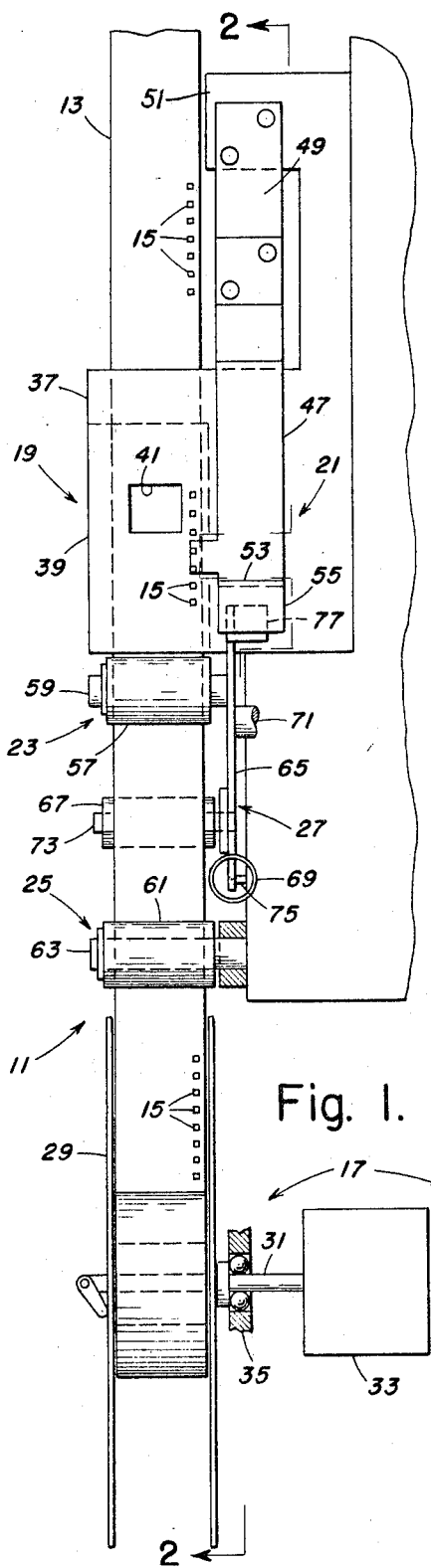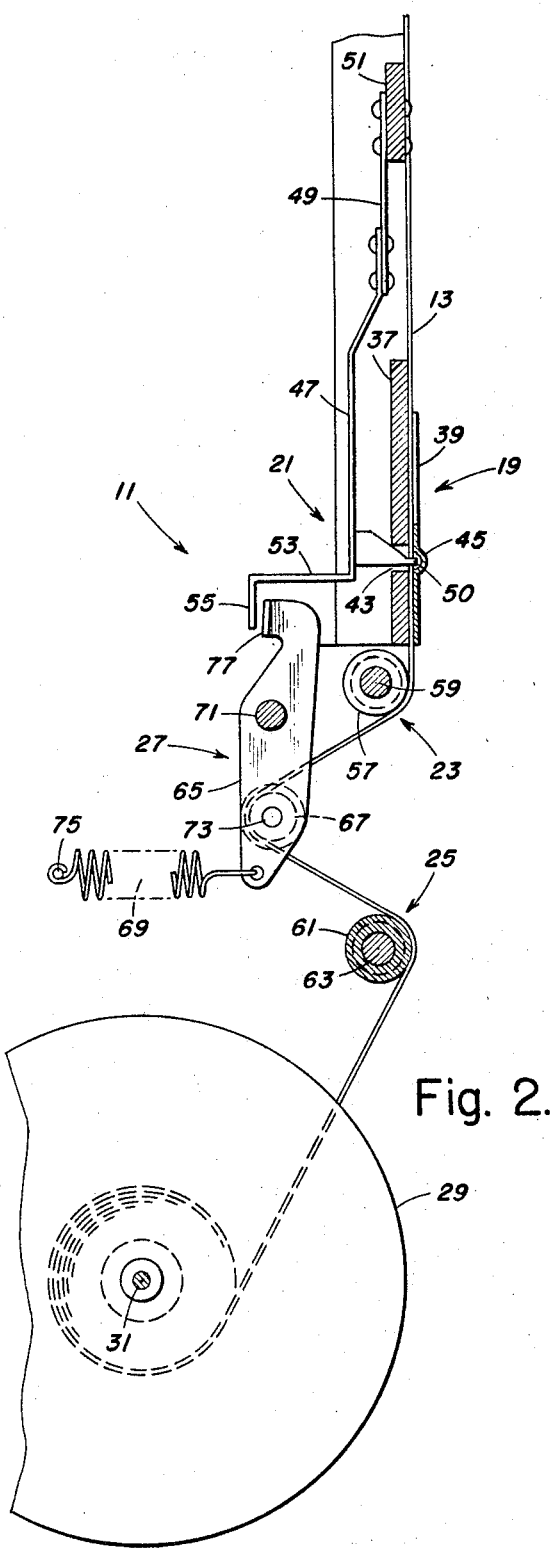
Fig. 1.
Fig. 2.

3,423,037
QUICK INTERMITTENT ADVANCEMENT APPARATUS AND METHOD
Paul J. Good, Springwater, N.Y., assignor to Minnesota Mining and Manufacturing Company, St. Paul, Minn., a corporation of Delaware
Filed Oct. 5, 1966, Ser. No. 584,560
U.S. Cl. 242—55.11                  11 Claims
Int. Cl. G11b *15/32;* B65h *25/04*

ABSTRACT OF THE DISCLOSURE

A resilient detent, engaging a perforation in motion picture film in the vicinity of a projection gate, prevents longitudinal movement of the film. Between the film gate and a take-up reel is a resilient feeler which moves in response to variations in longitudinal tension of the film. When the tension increases, the movement of the feeler caused thereby moves the detent out of the perforation in the film, allowing some of the film to move past the film gate, thereby decreasing the tension in the film between the gate and the take-up reel, so that the feeler moves in the opposite direction as a result of the decrease in tension, thereby allowing the detent to seat itself in another perforation of the film.

---

Figure 3:
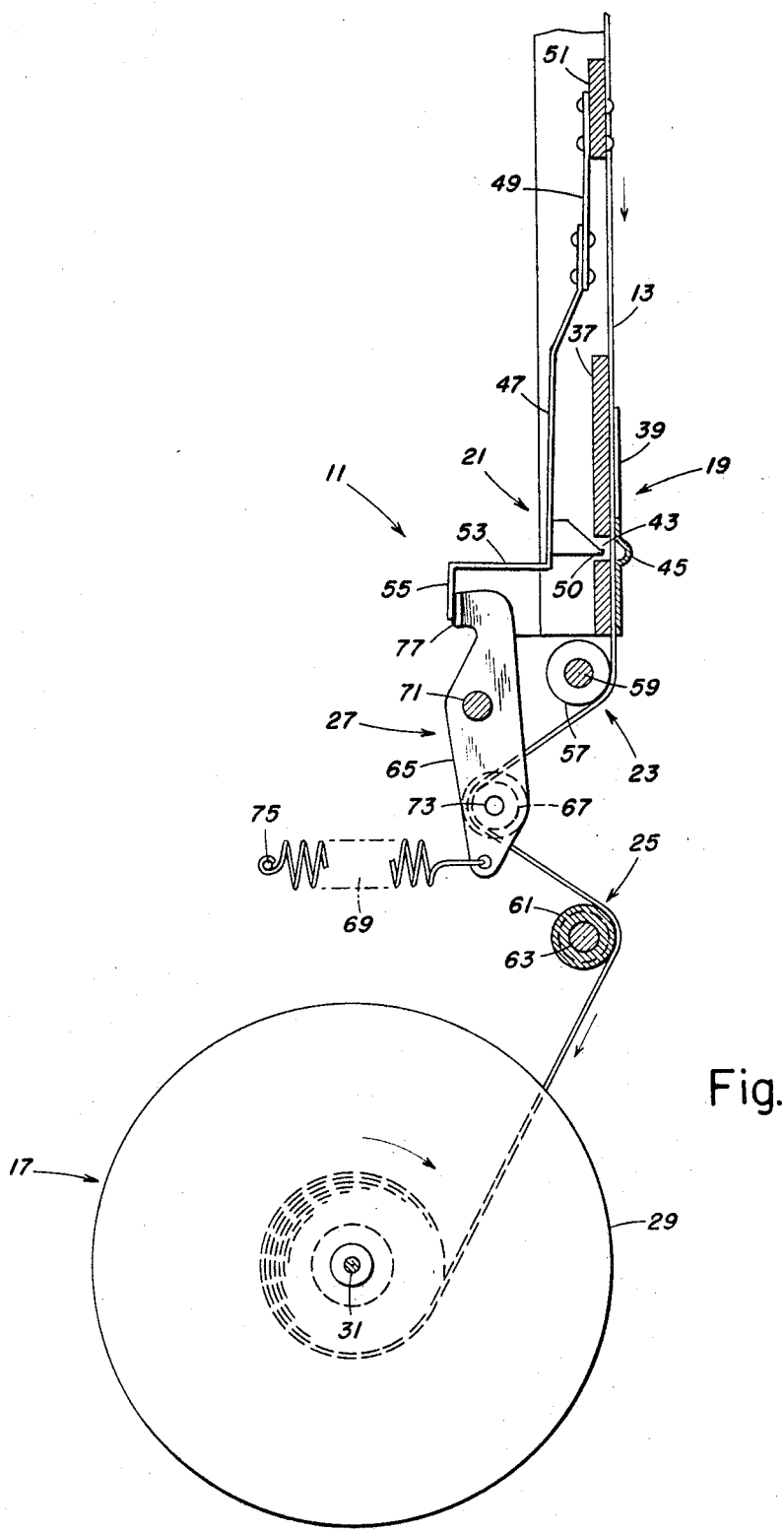

This invention relates to ways and means for moving quickly and intermittently perforated tape along a predetermined path.

Perforated tape as used herein refers to tape which has longitudinally linearly and regularly positioned perforations. It includes photographic film tape which commonly is called movie film and which is referred to herein merely as film.

As is well known, in most movie projectors film from a film supply reel is moved intermittently past a projection gate and thereafter substantially continuously wound up on a take-up reel. At the projection gate, the film is advanced frame by frame. A frame is brought into image projection position at the projection gate, there is a momentary pause in the travel of the film, and then the film is quickly moved so as to bring the next frame into image projection position.

The mechanism for accomplishing this is referred to as a claw mechanism. It comprises a rake member which has a projection that seats in a perforation of the film in the region of the projection gate, thrusts or pulls the film along a predetermined linear path for a distance substantially equal to the longitudinal dimension of a frame, unseats from the perforation and then returns to repeat the operation. In addition to the rake member the apparatus comprises a continuously rotating drive member and means for converting the continuous rotary motion into the type of motion necessary to operate the rake member. Most projectors also have a shutter mechanism which stops the projection of an image from the projector during the shift of the film from one frame to the next.

An object of this invention is to provide generally improved and more satisfactory ways and means for the intermittent advancement of movie film or the like past a projection gate or the like.

A specific object of this invention is to provide ways and means for advancing intermittently perforated tape along a predetermined path, wherein tension on the tape resulting, for example, from the continuous rotation of a take-up reel provides the forces that actuate the tape advancement means.

These and other desirable objects may be attained in the manner disclosed as an illustrative embodiment of the invention in the following description and in the accompanying drawing forming a part hereof, in which:

FIG. 1 is a partially diagrammatic rear view of the projection gate and take-up reel sections of a movie projector having a preferred specific embodiment of a quick intermittent advancement apparatus of this invention;

FIG. 2 is a partially sectioned side view of the specific embodiment of FIG. 1, which view has been taken as indicated by the viewing and offset sectioning plane 2—2 in FIG. 1, and which view shows the various moving parts as they appear at the beginning of a cycle of operation, which is right after film in the projection gate has been advanced; and FIG. 3 is another partially sectioned side view of the embodiment of FIG. 1, which view has been taken as though along the viewing and offset sectioning plane 2—2 in FIG. 1, and which view shows the various moving parts as they appear during the film advancement portion of a cycle of operation.

FIGS. 1–3, broadly considered, disclose a specific embodiment of an apparatus for imparting intermittent motion in a predetermined zone to that portion therein of a tape having a predetermined path of travel to, through and away from said zone.

The apparatus comprises pulling means in the path of travel of the tape for continuously pulling the tape away from the zone. Under normal operative conditions, therefore, the tape between the pulling means and the zone is under tension. The apparatus further comprises detent means in the zone, which are engageable with at least part of said portion for arresting travel of said portion through said zone, and disengageable from said portion to permit travel of said portion through said zone. First biasing means are provided for normally urging the detent means into engagement with the tape. Between the detent means and the pulling means are first support means for supporting one side of the tape under tension, while between the first support means and the detent means are second support means for supporting the same side of the tape under tension. Under normal operative conditions a bend in the direction of that side is established and maintained in the tape between the first and second support means. Tape bend engaging means are provided for engaging the other side of the tape in the bend, which are movable from at least a maximum bend position of the tape to a minimum bend position of the tape for continuously yielding tape in the bend to the pulling means. Second biasing means are present for normally urging the tape bend engaging means toward the maximum bend position. However, the second biasing means are yieldable to pulling forces on the tape transmitted to the tape bend engaging means. In combination with the tape bend engaging means are knockout means for disengaging the detent means from the tape when the tape bend engaging means reaches the minimum bend position.

In prepared embodiments of the apparatus of this invention the tape is a perforated tape. In addition, in these preferred embodiments the detent means comprise at least one detent transversely disposed relative to the tape, and insertable into a perforation for arresting movement of the tape, and removable from the perforation so as to release the tape for travel in the predetermined path in the zone.

All of these structural features are present in the specific embodiment illustrated in FIGS. 1–3.

STRUCTURE

FIGS. 1–3, in detail, disclose pertinent parts of a movie projector conventional in substantially all respects, except that it is equipped with and adapted for a specific embodiment 11 of an apparatus of this invention for the swift intermittent advancement of a movie film 13 having linearly, regularly and longitudinally disposed marginal perforations 15.

The specific apparatus 11 comprises a take-up reel assembly 17, a projection gate assembly 19, a detent assembly 21, a first roller assembly 23, a second roller assembly 25, and a rocker arm assembly 27.

The take-up reel assembly 17 in the embodiment shown is conventional and, therefore, need not be described in detail. It comprises a take-up reel 29 mounted on a rotatable drive shaft 31 coupled to a continuous drive unit 33. The take-up reel drive shaft 31 is carried by a support structure 35 which is part of the projector.

The projection gate assembly 19, only the pertinent parts of which are shown, comprises a slide plate 37 and a pressure plate 39. The slide plate has a projection aperture 41 therethrough in alinement with a projection aperture (not shown) in the pressure plate 39. The structure of the projection gate assembly 19 with the slide plate 37 presenting a film slide surface adjacent a film confining surface provided by the pressure plate 39 is conventional, except that the slide plate 37 has a detent opening 43 and the pressure plate 39 has a detent recess 45, which are in alinement with each other and with a perforation 15 in the film 13 when the film is properly positioned between the slide plate 37 and the pressure plate 39 with a frame of the film 13 in position relative to the projection aperture 41 in the pressure plate 39 and the corresponding projection aperture in the slide plate 37. As is usual, the projection gate assembly 19 is longitudinally spaced from the take-up reel assembly 17.

The detent assembly 21 comprises a detent arm member 47 and a spring leaf member 49. The detent arm member 47 is disposed generally parallel to the path of travel of the film 13 into, through and out of the projection gate assembly 19. The detent arm member comprises a detent 50 normally disposed transversely to said path of travel through the projection gate assembly 19, and in alinment with the detent opening 43 in the slide plate 37 and the detent recess 45 in the pressure plate 39. One end of the detent arm member 47, which corresponds to the film entrance end of the projection gate assembly 19, is secured to one end of the spring leaf member 49, the other end of the spring leaf member 49 being fastened to a support 51 which is part of the projector. The other end of the detent arm member 47 comprises a transverse web 53 and a knockout flange 55 which extends in the general direction of film travel and which is generally parallel to the film path in the proection gate assembly 19.

The first roller assembly 23 comprises a roller 57 rotatably mounted on a pin 59 which is part of the projector. The axis of rotation of the roller 57 is positioned adjacent the film exit of the projection gate assembly 19 in a plane generally parallel to the film path in the projection gate assembly, but transversely to the general direction of film travel. Furthermore, the axis of rotation of the roller 57 is positioned so that the circumferential periphery of the roller 57 forms a supporting surface for the film 13 as it emerges from the film exit of the projection gate assembly 19 on its way to the take-up reel 29.

The second roller assembly 25 comprises a roller 61 rotatably disposed on a pin 63 which is part of the projector. The axis of rotation of the roller 61 is in a plane generally parallel to the film path in the projection gate assembly, and is arranged transversely to the general direction of travel of the film 13. Moreover, it is positioned between the first roller assembly 23 and the take-up reel 29.

The rocker arm assembly 27 comprises a rocker arm 65, a film bend or loop engaging roller 67, and a spring 69. The rocker arm 65 is pivotally mounted on a rocker arm pin 71 which is part of the projector. The axis of rotation of the rocker arm 65 is between the ends of the rocker arm and is generally parallel to the axes of rotation of the rollers 57 and 61 of the first and second roller assemblies 23 and 25. The film bend engaging roller 67 is rotatably carried by a spindle 73 which is part of the rocker arm 65. The spindle 73 and thus the axis of rotation of the film bend engaging roller 67 are generally parallel to the axis of rotation of the rocker arm 65, and are positioned generally between the axes of rotation of the rollers 57 and 61 of the first and second roller assemblies 23 and 25, but in a plane generally parallel to and spaced from a plane through the axes of rotation of the rollers 57 and 61. Furthermore, the film bend engaging roller 67 and its spindle 73 are positioned on the rocker arm 65 between the axis of rotation of the rocker arm and the longitudinal end thereof which in the embodiment shown is oriented toward the take-up reel 29. This end of the rocker arm 65 is attached to one end of the spring 69, in this embodiment a spiral tension spring, the other end of which is secured to a lug 75 which is part of the projector. The spring 69 is positioned so as to bias the film bend engaging roller 67 away from the plane of the axes of rotation of the rollers 57 and 61 of the first and second roller assemblies 23 and 25, and toward a maximum bend position of the film bend formed under normal operative conditions.

The other end of the rocker arm 65, which, longitudinally, is on the other side of the pivotal axis of the rocker arm, comprises a striker flange 77 positioned so as to bear against the knockout flange 55 of the detent arm member 47, when the rocker arm 65 is pivoted on its pivotal axis to where the film bend engaging roller 67 is at a predetermined minimum bend position of the film between the rollers 57 and 61.

OPERATION

To operate the specific apparatus 11, the rocker arm 65 is pivoted so as to place the film bend engaging roller 67 at least at the minimum bend position so that the striker flange 77 bears against the knockout flange 55 sufficently to retract the detent 50 out of the film path in the projection gate assembly 19. The leader portion of a film 13 is then threaded through the projection gate assembly 19, curved about the roller 57, looped around the film bend engaging roller 67, curved about the roller 61 of the second roller assembly 25, and threaded onto the take-up reel 29. The rollers 57 and 61 bear against the same side of the film 13 while the film bend engaging roller 67 bears against the opposite side of the film 13. In the projection gate assembly 19, the film 13 is positioned so that a perforation 15 is in substantial alinement with the detent opening 43 in the side plate 37 and thus the detent 50. The rocker arm 65 is thereupon released so that the detent 50 by action of the spring leaf member 49 is inserted into the alined perforation 15.

Operation of the projector is then commenced, whereby the take-up reel is continuously driven by the continuous drive unit 33. The continuous rotation of the take-up reel 29 pulls on the film looped around the film bend engaging roller 67. However, the detent 50 in a film perforation 15 in that portion of the film 13 in the projection gate assembly 19 in effect anchors that portion of the film in the projection gate assembly. Consequently, the rocker arm 65 commences to pivot so as to relieve the tension of the film 13 looped about the film bend engaging roller 67. As the rocker arm 65 pivots, its striker flange 77 comes into contact with the knockout flange 55 of the detent arm member 47 and pushes the knockout flange 55 outwardly so as to unseat the detent 50 from the film perforation 15. This releases the film 13 in the projection gate assembly 19 and it is pulled forwardly by the tension on the film. By the time the next frame on the film 13 is in position relative to the projection aperture 41 in the pressure plate 39 and the projection aperture through the slide plate 37, the reduction in tension on the film looped about the film bend engaging roller 67 is sufficient to permit the spring 69 to return pivot the rocker arm 65 until the film engaging roller 67 is at the maximum bend position of the film bend whereat, because of the spring leaf member 49 of the detent assembly 21, the detent 50 is thrust through the detent opening 43 in the slide plate 37 into a perforation 15. The cycle is then repeated, frame by frame.

The film reaching the projection gate assembly 19 comes from a conventional film supply reel which can either rotate free or be rotatably driven by a drive unit synchronized with the continuous drive unit 33 for the take-up reel 29. In either case the action of the quick intermittent film advancement apparatus 11 is sufficient to draw the film from the film supply reel to the projection gate assembly 19.

Under normal operative conditions, advancement of film occurs so rapidly in each cycle of operation that in some projectors a shutter mechanism is no longer required. This is a major feature of advantage of this invention.

Still other features of advantage of the film advancement apparatus 11 of this invention are the simplicity of construction and the inherent ruggedness of the various structural elements which make up the apparatus.

Other features, advantages and specific embodiments will be readily apparent to those in the exercise of ordinary skill in the art after reading the foregoing disclosure. For instance, pulling forces on the film 13 can be exerted by a rotatably driven sprocket wheel, the axis of rotation of which is generally parallel to the axis of rotation of the roller 57 of the first roller assembly 23. Under normal operative conditions the sprockets of the sprocket wheel seat in the film perforations. The rotatably driven sprocket wheel can be between the roller 61 of the second roller assembly 25 and the take-up reel, or it can be in place of the roller 61 of the second roller assembly 25.

It is seen from the foregoing disclosure that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. An apparatus for imparting intermittent motion in a predetermined zone to that portion therein of a tape having a predetermined path of travel to, through and out of said zone, which comprises:

(A) pulling means in the path of travel of said tape for continuously pulling said tape from said tape from said zone, whereby said tape between said means and said zone under normal operative conditions is under tension;

(B) detent means in said zone engageable with at least part of said portion of said tape for arresting travel of said portion of said tape in said zone, and disengageable from said portion to permit travel of said portion of said tape in said zone;

(C) first biasing means normally urging said detent means into engagement with said portion of said tape;

(D) first support means between said pulling means and said detent means for supporting one side of said tape under tension;

(E) second support means between said first support means and said detent means for supporting said side of said tape under tension;

(F) tape bend engaging means between said first and second support means for engaging a bend in said tape between said first and second support means and movable from at least a maximum bend position to a minimum bend position of said tape to continuously yield tape in said bend to said pulling means under normal operative conditions;

(G) second biasing means normally urging said tape bend engaging means toward said maximum bend position of said tape between said first and second support means, but yieldable to pulling forces on said tape transmitted to said tape bend engaging means; and (H) knockout means in combination with said tape bend engaging means for disengaging said detent means from said portion of said tape when said tape bend engaging means reaches said minimum bend position.

2. An apparatus according to claim 1, wherein said tape has linearly, regularly, longitudinally and marginally disposed perforations, and said detent means comprise at least one detent member transversely disposed to said portion of said tape, and insertable into and removable from said perforations.

3. An apparatus according to claim 2, wherein said pulling means comprise a take-up reel and means for rotating said reel.

4. An apparatus according to claim 3, wherein said detent means comprise a detent arm at one end having a transverse web with a knockout flange, and said first biasing means comprise a spring leaf secured to the other end of said detent arm.

5. An apparatus according to claim 4, wherein said first support means comprise a support roller with an axis of rotation generally parallel to the plane of said path in said zone, and transversely disposed to the general path of travel of said tape out of said zone.

6. An apparatus according to claim 5, wherein said knockout means comprise a rocker arm pivotally mounted on an axis of rotation generally parallel to the axis of rotation of said support roller, said rocker arm having at one end on one side of its axis of rotation a striker flange in alinement with said knockout flange and bearing against it when said tape bend engaging means are at said minimum bend position sufficiently to remove said detent member from a tape perforation.

7. An apparatus according to claim 6, wherein said tape bend engaging means comprise a bend engaging roller on an axis of rotation generally parallel to said axis of rotation of said support roller.

8. An apparatus according to claim 7, wherein said perforated tape is movie film.

9. Motion picture film advancing mechanism for advancing motion picture film intermittently past a projection position so that successive frames of the film may pause momentarily in the projection position, said mechanism comprising a releasible detent near said projection position for engaging a perforation in said film to hold said film against longitudinal movement, film take-up means spaced from said detent and tending to draw film continuously from said projection position toward said take-up means, film loop means including a movably mounted member tending to displace the film to form a loop of variable size therein between said projection position and said take-up means, means operated by movement of said movably mounted member in a loop decreasing direction for releasing said detent, and resilient means tending to move said detent to film holding position and to move said movably mounted member in a loop increasing direction, the parts being so arranged that when the detent is engaged in a perforation of the film to hold the film against longitudinal movement, operation of said take-up means will increase longitudinal tension on the film to tend to straighten said loop, thereby moving said movably mounted member in said loop decreasing direction to release said detent to allow the film to move longitudinally past said projection position, and when the film moves longitudinally past said projection position as a result of the release of said dentent, the resultant lessening of longitudinal tension on the film will allow said movably mounted member to move in a loop increasing direction and enable said detent to engage another perforation in the film.

10. Motion picture film advancing mechanism for intermittently advancing film having a series of perforations therein, comprising:
  (a) means for guiding film in a path of travel past a projection gate,
  (b) a displaceable detent having an effective position engaging a perforation in said film in the vicinity of said projection gate, to prevent longitudinal movement of said film,
  (c) said detent being displaceable from said effective position to an ineffective position in which it does not prevent longitudinal movement of said film,
  (d) pulling means for pulling the film longitudinally in a direction away from said gate,
  (e) a resiliently mounted feeler engaging said film between said gate and said pulling means,
  (f) the position of said feeler varying with variations in the degree of longitudinal tension in the portion of film engaged by said feeler, and
  (g) means operated by movement of said feeler for displacing said detent to an ineffective position when said feeler moves to a predetermined extent in response to increasing longitudinal tension on the portion of the film engaged by said feeler.

11. A construction as defined in claim 10, further including two guide rollers engaging the same surface of the film at points spaced from each other in a direction longitudinally of the film, said feeler including a pivoted lever and a feeler roller engaging the opposite surface of the film at a point between said two guide rollers and tending to form a loop in the film between said two guide rollers, said means for displacing said detent including a portion on said lever for engaging said dentent to move it from effective position to ineffective position.

References Cited
UNITED STATES PATENTS

| | | | |
|---|---|---|---|
| 3,198,410 | 8/1965 | Borberg | 226—56 |
| 3,350,023 | 10/1967 | Bundschuh | 242—55.11 |

LEONARD D. CHRISTIAN, *Primary Examiner.*

U.S. Cl. X.R.

226—56, 44